(12) United States Patent
Lucas et al.

(10) Patent No.: US 7,722,986 B2
(45) Date of Patent: May 25, 2010

(54) FLEXIBLE, AQUEOUS, CONTROLLED EMISSION ELECTROCHEMICAL CELL

(75) Inventors: Valerie Lucas, Villennes sur Seine (FR); Lionel Beluze, Rennes (FR); Mathieu Morcrette, Amiens (FR); Jean-Marie Tarascon, Mennecy (FR)

(73) Assignee: European Aeronautic Defence and Space Company, Eads (FR)

( * ) Notice: Subject to any disclaimer, the term of this patent is extended or adjusted under 35 U.S.C. 154(b) by 528 days.

(21) Appl. No.: 11/793,105

(22) PCT Filed: Dec. 19, 2005

(86) PCT No.: PCT/FR2005/051106

§ 371 (c)(1),
(2), (4) Date: Jun. 15, 2007

(87) PCT Pub. No.: WO2006/067354

PCT Pub. Date: Jun. 29, 2006

(65) Prior Publication Data

US 2008/0131773 A1 Jun. 5, 2008

(30) Foreign Application Priority Data

Dec. 21, 2004 (FR) .................................... 04 53111

(51) Int. Cl.
*H01M 10/36* (2006.01)
*H01M 4/00* (2006.01)

(52) U.S. Cl. ....................... 429/204; 429/209; 429/247; 359/265; 359/267; 359/269; 359/275

(58) Field of Classification Search ................. 429/204, 429/209, 247; 359/265, 267, 269, 275
See application file for complete search history.

(56) References Cited

U.S. PATENT DOCUMENTS

2005/0191558 A1* 9/2005 Sannier et al. .............. 429/303

OTHER PUBLICATIONS

Bessiere A et al.: "Flexible electrochromic reflectance device based on tungsten oxide for infrared emissivity control" Journal of Applied Physics, American Institute of Physics. New York, US, vol. 91, No. 3, Feb. 1, 2002, pp. 1589-1594.*

(Continued)

*Primary Examiner*—Dah-Wei D Yuan
*Assistant Examiner*—Amanda Barrow
(74) *Attorney, Agent, or Firm*—Nixon Peabody LLP

(57) ABSTRACT

The invention concerns an electrochromic cell in thin films and aqueous electrolyte, with an emissivity that varies as a function of an applied control voltage. It is formed of the following flexible elements, superimposed and respectively in intimate contact:

a first current collector (11) in electrically conducting material and intended to be connected to a first potential of the control voltage, a porous counter electrode (12) formed of a mixture of PVDF-HFP, PEO and a powder of a compound comprising complementary ions of an insertion material, a porous separator (13) formed of a mixture of PVDF-HFP and PEO, a second current collector (14) in electrically conducting material, intended to be connected to a second potential of the control voltage and capable of being traversed by ions, a porous electronic conduction layer (15) formed of a mixture of PVDF-HFP, PEO and a powder of an electrically conducting material, a porous active layer (16) formed of a mixture of PVDF-HFP, PEO and a powder of an insertion material.

11 Claims, 3 Drawing Sheets

OTHER PUBLICATIONS

Pages H et al.: "Wide band electrochromic displays based on thin conducting polymer films" Electrochimica Acta, Elsevier Science Publishers, Barking, GB, vol. 46, No. 13-14, Apr. 2, 2001, pp. 2137-2143.*

International Search Report, FA 660204 and FR 0453111, 2 pgs, (Jun. 21, 2005).

Bessiére, A. et al., "Flexible Electrochromic Reflectance Device Based On Tungsten Oxide For Infrared Emissivity Control", Journal of Applied Physics, American Institute of Physics, New York, US, vol. 91, No. 3, (Feb. 1, 2002), pp. 1589-1594, XP012055677, ISSN: 0021-8979, p. 1589-p. 1592, Fig. 1, Abstract.

Bessiére, A. et al., "Control of Powder Microstructure For Improved Infrared Reflectance Modulation Of An Electrochromic Plastic Device", Chem. Mater., vol. 15, No. 13, (May 30, 2003), XP002332809, USA, p. 2577-p. 2579, Fig. 1.

Chandrasekhar, Prasanna et al., "Large, Switchable Electrochromism In The Visible Through Far-Infrared In Conducting Polymer Devices", Advanced Functional Materials, Wiley Intersciences, Wienheim, DE, vol. 12, No. 2, (Feb. 2002), pp. 95-103, XP001123864, ISSN: 1616-301X, p. 95-p. 97, Fig. 1.

Pagés, H. et al., "Wide Band Electrochromic Displays Based On Thin Conducting Polymer Films", Electrochimica ACTA, Elsevier Science Publishers, Barking, GB, vol. 46, No. 13-14, (Apr. 2, 2001), pp. 2137-2143, XP004233995, ISSN: 0013-4686, p. 2137-p. 2139, Fig. 1.

* cited by examiner

FLEXIBLE, AQUEOUS, CONTROLLED EMISSION ELECTROCHEMICAL CELL

CROSS REFERENCE TO RELATED APPLICATIONS OR PRIORITY CLAIM

This application is a national phase of International Application No. PCT/FR2005/051106 entitled "Flexible Electrochemical Cell With Controlled Optical Absorption And Reflection Having An Aqueous Electrolyte", which was filed on Dec. 19, 2005, which was not published in English, and which claims priority of the French Patent Application Nos. 04 53111 filed Dec. 21, 2004.

TECHNICAL FIELD

The invention concerns a flexible, aqueous, controlled emission electrochemical cell.

STATE OF THE PRIOR ART

U.S. Pat. No. 5,296,318 discloses a rechargeable battery comprising composite electrodes and using lithium as insertion ions. This battery uses different powders that are incorporated in a polymer matrix that is in the form of a film. This structure procures two advantages. Firstly, it confers a mechanical strength to the powder. Secondly, the films formed from the different components of a battery may be laminated together with current collectors in the form of a grid so as to form a completely flexible cell.

The cells developed by this technique of the prior art use a hydrophobic copolymer type polymer of vinylidene fluoride and hexafluoropropylene (PVDF-HFP). They therefore employ organic type solvents such as dimethylcarbonate, propylene carbonate, ethylene carbonate or acetonitrile.

These cells are not controlled emission cells. They use an organic medium that does not favour the rapid insertion of ions.

Moreover, the document "Flexible electronic reflectance device based on tungsten oxide for infrared emissivity control" by A. BESSIERE et al., Journal of Applied Physics, Vol. 91, No 3, 1 Feb. 2002, proposes a device with variable emissivity in the infrared using an electrochemical cell in non aqueous medium. The transparency in the infrared of this device is not optimised. In addition, the switching time is long.

DESCRIPTION OF THE INVENTION

To overcome the disadvantages of the prior art, the present invention proposes a flexible electrochromic cell operating in aqueous medium. The interest of an aqueous medium is that it enables a faster ionic exchange thanks to higher ionic conductivities due to the fact of the high dissociation constant of water. As other advantages of water, one may note its transparency in the infrared and the respect of the environment. The formation of an aqueous cell involves finding a suitable polymer and implementing said polymer.

One may then use such a cell to form a device with variable emissivity in the infrared. To do this, the electrochemical cell according to the invention has a specific layout of its constituent layers in order to be able to observe the optical properties affording to the ions access to the electro-active material.

The subject of the invention is therefore an electrochromic cell in thin films with an emissivity that varies as a function of an applied control voltage, characterised in that it is formed of the following flexible elements, superimposed and respectively in intimate contact:
- a first current collector in electrically conducting material and intended to be connected to a first potential of the control voltage,
- a porous counter electrode formed of a mixture of PVDF-HFP, PEO, if necessary at least one other hydrophilic polymer, and a powder of insertion ion reservoir compound or capable of absorbing ions complementary to the insertion ions,
- a porous separator formed of a mixture of PVDF-HFP and PEO,
- a second current collector in electrically conducting material, intended to be connected to a second potential of the control voltage and capable of being traversed by ions,
- a porous electronic conduction layer formed of a mixture of PVDF-HFP, PEO and a powder of an electrically conducting material,
- a porous active layer formed of a mixture of PVDF-HFP, PEO and a powder of an insertion material, the counter electrode, the separator, the electronic conduction layer and the active layer being filled with an aqueous electrolyte.

The first and second current collectors may be grids. These grids may be metallic (in aluminium, in copper or in lead for example) and preferably stainless, in ITO. They may be in stainless steel advantageously coated with a mixture of carbon and PVDF-HFP copolymer.

Preferably, the mixture of PVDF-HFP and PEO in the flexible elements comprises, by weight, between 80% and 50% of PVDF-HFP and between 20% and 50% of PEO.

The ion reservoir compound comprising ions complementary to the insertion ions may be chosen among $H_xWO_3$, $H_xWO_3.H_2O$, $H_xMoO_3$, a polymer such as polyaniline (PANI) or activated carbon, preferably coated with polymer.

The insertion ions are ions such as $Na^+$, $Mg^{2+}$ that may be inserted in materials such as $WO_3.H_2O$ and $WO_3$.

The electrically conducting material of the electronic conduction layer may be chosen among graphite carbon and metals.

The aqueous electrolyte may in particular contain sulphuric acid.

BRIEF DESCRIPTION OF DRAWINGS

The invention will be more fully understood and other advantages and specific features will become clear on reading the description that follows, given by way of example and in nowise limitative, along with the appended drawings among which.

DETAILED DESCRIPTION OF SPECIFIC EMBODIMENTS

As has been stated above, the PVDF-HFP copolymer is hydrophobic. However, this copolymer is very interesting due to its remarkable mechanical properties. For this polymer to be able to absorb water, it is proposed here to add to it a hydrophilic polymer. One proposes polyethylene oxide (PEO), which is strongly hydrophilic.

It firstly involves finding the right composition for the mixture of PVDF-HFP and PEO, in other words a composition for which the mixture absorbs a large quantity of water while at the same time maintaining a suitable mechanical strength.

Figure 1:
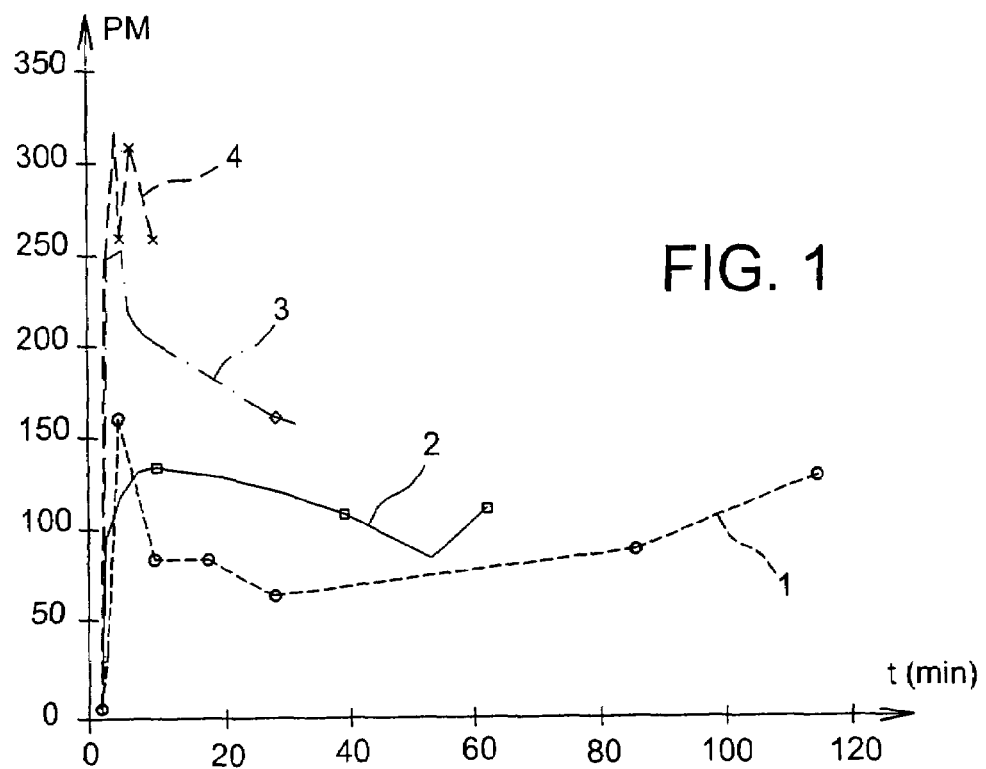
FIG. 1 is a diagram representing weight gain curves for different mixtures of polymers used to form the electrochemical cell according to the invention.

FIG. 1 is a diagram representing weight gain (WG) curves in % for different mixtures of PVDF-HFP and PEO as a function of the absorption time t in minutes. The PVDF-HFP copolymer used comprises 12% molar HFP. Curve 1 corresponds to the PVDF-HFP copolymer (therefore without PEO). Curve 2 corresponds to a mixture comprising 80% by weight of PVDF-HFP and 20% by weight of PEO. Curve 3 corresponds to a mixture comprising 60% by weight of PVDF-HFP and 40% by weight of PEO. Curve 4 corresponds to a mixture comprising 50% by weight of PVDF-HFP and 50% by weight of PEO.

The bell shape of the curves shows that the PEO dissolves in water. It is the PVDF-HFP that assures the mechanical strength. Compositions greater than 50% by weight of PEO have been tested. They do not have sufficient mechanical strength. However, the addition of a silica filler should enable the percentage of PEO to be further increased.

Electrical conductivity tests with a solution of sulphuric acid have been carried out. The results show that from the incorporation of 30% of PEO, the conductivities obtained are greater than those of non aqueous batteries, namely $1.61 \cdot 10^{-4}$ $S.cm^{-1}$. A very high performance electrolyte is thereby obtained simply.

Films in mixture of PVDF-HFP and PEO may be formed with laboratory material. For a film of 50% by weight of PEO, 1 g of PEO is introduced into a pill making machine and dispersed in 1.5 mL of ether before adding acetonitrile up to the up to the half way mark of the flask. The stoppered flask is then agitated until the PEO is well solvated. Then 1 g of PVDF-HFP (comprising 12% molar HFP), 2 g of di-n butyl phthalate (DBP) that acts as plastifier and acetone are added. The solution is then mixed for 15 minutes at an approximate rate of 2000 rpm before being spread out on a glass plate by means of a doctor blade enabling the thickness of the deposit to be controlled. After evaporation of the solvents, one obtains films in the form of ribbons 5 cm wide and around 1.2 m long.

Figure 2:
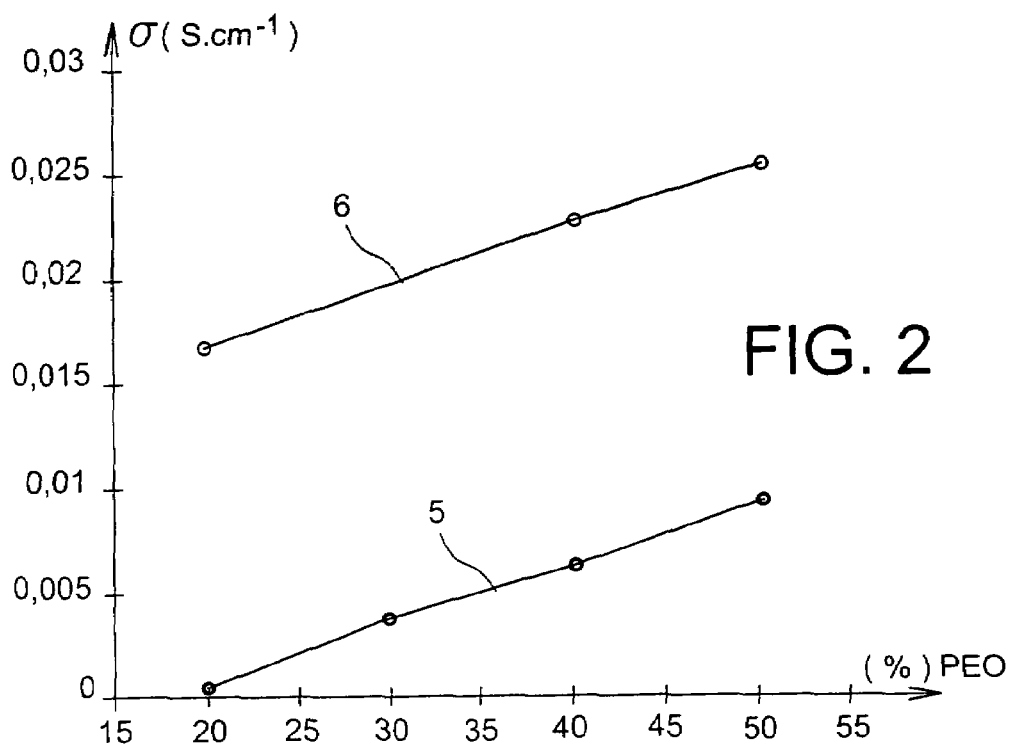
FIG. 2 is a diagram representing the electrical conductivity as a function of the concentration in sulphuric acid for the copolymers used to form the electrochemical cell according to the invention.

FIG. 2 is a diagram representing the electrical conductivity for different concentrations of $H_2SO_4$ and different concentrations by weight of PEO in the mixture of PVDF-HFP and PEO. Curve 5 has been traced for a concentration of $H_2SO_4$ equal to 1 M. Curve 6 has been traced for a concentration of $H_2SO_4$ equal to 0.1 M.

Plastic films in mixture of PVDF-HFP and PEO comprising active materials may be formed in the same way, but by adding at the end of manufacture the active materials in powder form. An active material/polymer ratio equal to 3.66 (weight ratio) has been used. One may also use a greater quantity of active material.

Figure 3:
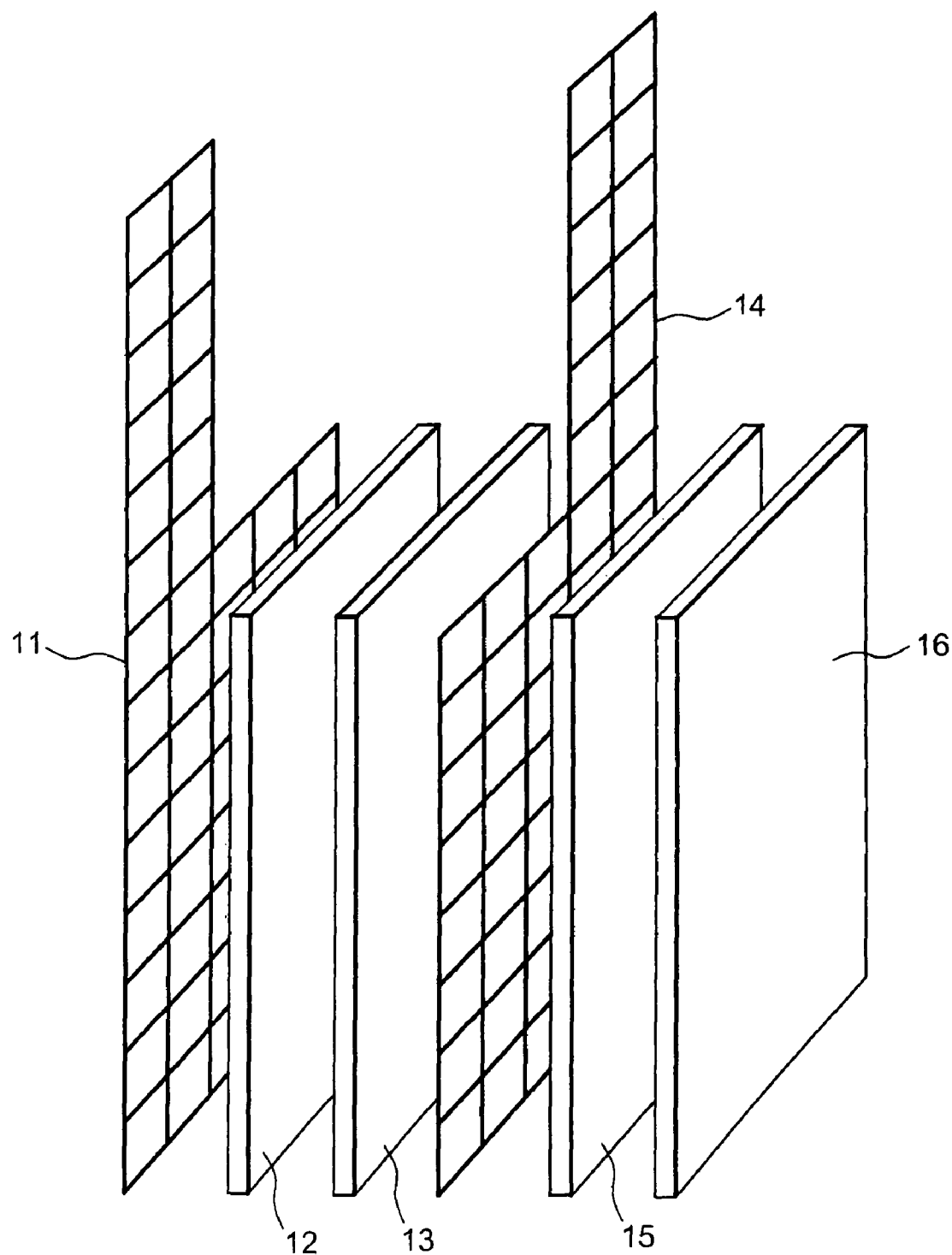
FIG. 3 represents a diagram of the layout of different composite films to form an electrochemical cell according to the invention.

FIG. 3 is a diagram of the layout of different active material-polymer composite films to obtain an electro-active device that operates in visible light and the infrared.

The cell of FIG. 3 comprises in superposition a collector 11, a counter electrode 12, a separator 13, a collector 14, a film based on graphite 15 and a film of active material 16. The films 11 to 16 are assembled so as to form an "optical battery". The current collectors 11 and 14 are grids in stainless steel (mesh dimension of the grids around 0.5 mm). To make these grids less sensitive to the electrolyte, one may coat them with a mixture of carbon and PVDF-HFP (comprising 12% molar HFP). This hydrophobic mixture enables the strength of the collectors in cycling to be improved.

The counter electrode may comprise an insertion material stable in acid medium or activated carbon. The counter electrode 12 may be formed of $H_xWO_3.H_2O$ (where $0<x\leq0.35$) in a mixture comprising 60% by weight of PVDF-HFP (12% molar HFP) and 40% by weight of PEO.

The separator 13 is formed from a mixture comprising 50% by weight of PVDF-HFP (12% molar HFP) and 50% by weight of PEO.

The film 15 comprises carbon (between 30 and 60% by weight) in a mixture comprising 50% by weight of PVDF-HFP (12% molar HFP) and 50% by weight of PEO. This film makes it possible to assure a better distribution of electrical charges on the film of active material 16.

The film of active material 16 comprises monohydrated tungsten oxide $WO_3.H_2O$ in a mixture of 60% by weight of PVDF-HFP (12% molar HFP) and 40% by weight of PEO. The material $WO_3.H_2O$ may be replaced by any other species stable in acid medium and capable of inserting protons.

The films in mixture of PVDF-HFP and PEO (the counter electrode 12, the separator 13, the electronic conduction layer 15 and the active layer 16) have been rendered porous by removal of the DBP used to form them. This removal may be obtained by placing the assembled cell in ether. The cell comprising the films rendered porous may then be filled with the aqueous electrolyte by immersing it in a vessel containing this electrolyte.

The thickness of the active layer 16 may be 9 μm. The thickness of the separator 13 may be between 10 μm and 100 μm.

Figure 4:
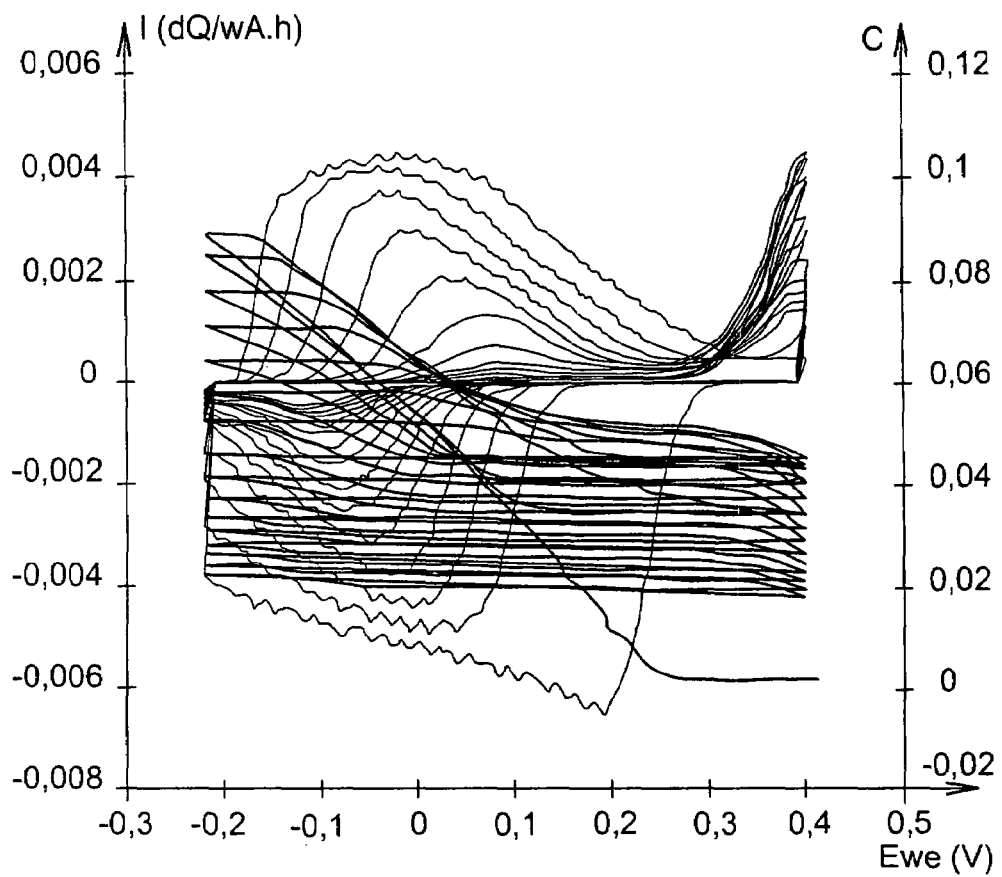
FIG. 4 is a diagram representing the evolution of the current and the charge during the cycling.

FIG. 4 represents different curves for the electrochemical cell described above and at 50 mV/s. This value of 50 mV/s represents the cycling rate of the cell, in other words the rate of evolution of the potential fixed by the user. The left Y-axis represents the intensity I. The right Y-axis represents the coefficient x of the compound $H_xWO_3.H_2O$ in the counter electrode 12. The X-axis represents the potential of the working electrode Ewe in volts. FIG. 4 shows that there is insertion of ions and therefore that the system works from an electrochemical point of view.

Figure 5:
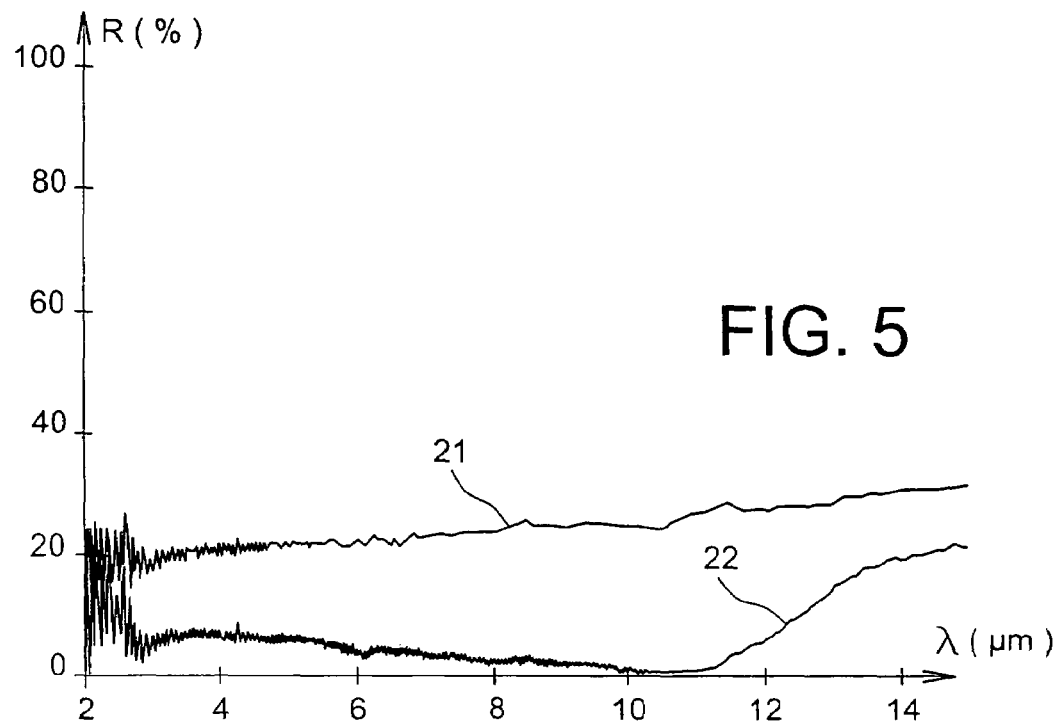
FIG. 5 is a diagram illustrating the optical properties of the electrochemical cell according to the invention.

FIG. 5 is a diagram illustrating the optical properties of the electrochemical cell according to the invention. This diagram represents the reflection (in %) of the cell as a function of the wavelength λ. Curve 21 corresponds to the ion reservoir compound $H_xWO_3.H_2O$. Curve 22 corresponds to the ion reservoir compound $WO_3.H_2O$. Curve 22 corresponds to the active layer 16 before insertion ($WO_3.H_2O$) and curve 21 corresponds to the active layer 16 after insertion ($H_xWO_3.H_2O$). This figure shows that the cell has a modulation of the reflection in the infrared. This figure also shows the absence of absorption band in the infrared due to the use of water as solvent.

The invention claimed is:
1. Electrochromic cell in thin films with an emissivity of light that varies as a function of an applied control voltage, formed of the following flexible elements, superimposed and respectively in intimate contact:
   a first current collector in electrically conducting material and intended to be connected to a first potential of the control voltage, a porous counter electrode formed of a mixture of polyvinylidene difluoride hexafluoropropylene (PVDF-HFP), polyethylene oxide (PEO), if necessary at least one other hydrophilic polymer, and a powder of a compound comprising ions complementary to insertion ions, a porous separator formed of a mixture of PVDF-HFP and PEO, a second current collector in electrically conducting material, intended to be connected to a second potential of the control voltage and capable of being traversed by ions, a porous electronic conduction layer of a mixture of PVDF-HFP, PEO and a powder of an electrically conducting material, a porous active layer formed of a mixture of PVDF-HFP, PEO and a powder of an insertion material, the counter electrode, the separator, the electronic conduction layer and the active layer being filled with an aqueous electrolyte.

2. Electrochemical cell according to claim 1, wherein the first current collector is a grid.

3. Electrochemical cell according to claim 1, wherein the second current collector is a grid.

4. Electrochemical cell according to claim 2, wherein the grid is in stainless steel.

5. Electrochemical cell according to claim 4, wherein the grid is coated with a mixture of carbon and PVDF-HFP copolymer.

6. Electrochemical cell according to claim 1, wherein the mixture of PVDF-HFP and PEO in the flexible elements comprises by weight, between 80% and 50% of PVDF-HFP and between 20% and 50% of PEO.

7. Electrochemical cell according to claim 1, wherein the ion reservoir compound comprising ions complementary to the insertion ions is chosen among $H_xWO_3$, $H_xWO_3.H_2O$, $H_xMoO_3$, a polymer and activated carbon.

8. Electrochemical cell according to claim 1, wherein the insertion ions are ions of a material chosen among $WO_3.H_2O$ and $WO_3$.

9. Electrochemical cell according to claim 1, wherein the electrically conducting material of the electronic conduction layer is chosen among graphite carbon and metals.

10. Electrochemical cell according to claim 1, wherein the aqueous electrolyte contains sulphuric acid.

11. Electrochemical cell according to claim 3, wherein the grid is in stainless steel.

\* \* \* \* \*